United States Patent [19]

Obermeyer

[11] Patent Number: 4,755,690
[45] Date of Patent: Jul. 5, 1988

[54] HYDROELECTRIC POWER INSTALLATION AND TURBINE GENERATOR APPARATUS THEREFOR

[76] Inventor: Henry K. Obermeyer, 36 Wickhams Fancy, Rivers Edge Road, Collinsville, Conn. 06022

[21] Appl. No.: 14,440

[22] Filed: Feb. 13, 1987

[51] Int. Cl.⁴ .................. F02B 9/02; F03B 13/10
[52] U.S. Cl. ........................................ 290/52; 290/54
[58] Field of Search ............... 290/43, 52, 54; 405/78

[56] References Cited

U.S. PATENT DOCUMENTS

| | | | |
|---|---|---|---|
| 4,143,990 | 3/1979 | Atencio | 405/78 |
| 4,165,467 | 8/1979 | Atencio | 290/52 |
| 4,207,015 | 6/1980 | Atencio | 290/52 X |
| 4,289,971 | 9/1981 | Ueda | 290/52 |
| 4,319,142 | 3/1982 | Mayo, Jr. | 290/52 |
| 4,447,739 | 5/1984 | Ferguson et al. | 290/52 |

Primary Examiner—William M. Shoop, Jr.
Assistant Examiner—W. E. Duncanson, Jr.
Attorney, Agent, or Firm—Victor E. Libert

[57] ABSTRACT

A hydroelectric power installation utilizes an array of turbine generators which are assembled at an elevated position above water and are moved as a unit to a submerged, operating position at the entrance of a discharge conduit. The assembled turbine generators and draft tubes are lowered to the submerged position along a track leading to the entrance of the conduit, and are placed in sealing relationship with the conduit in the submerged position to permit power to be generated from the full pressure head of the water.

22 Claims, 5 Drawing Sheets

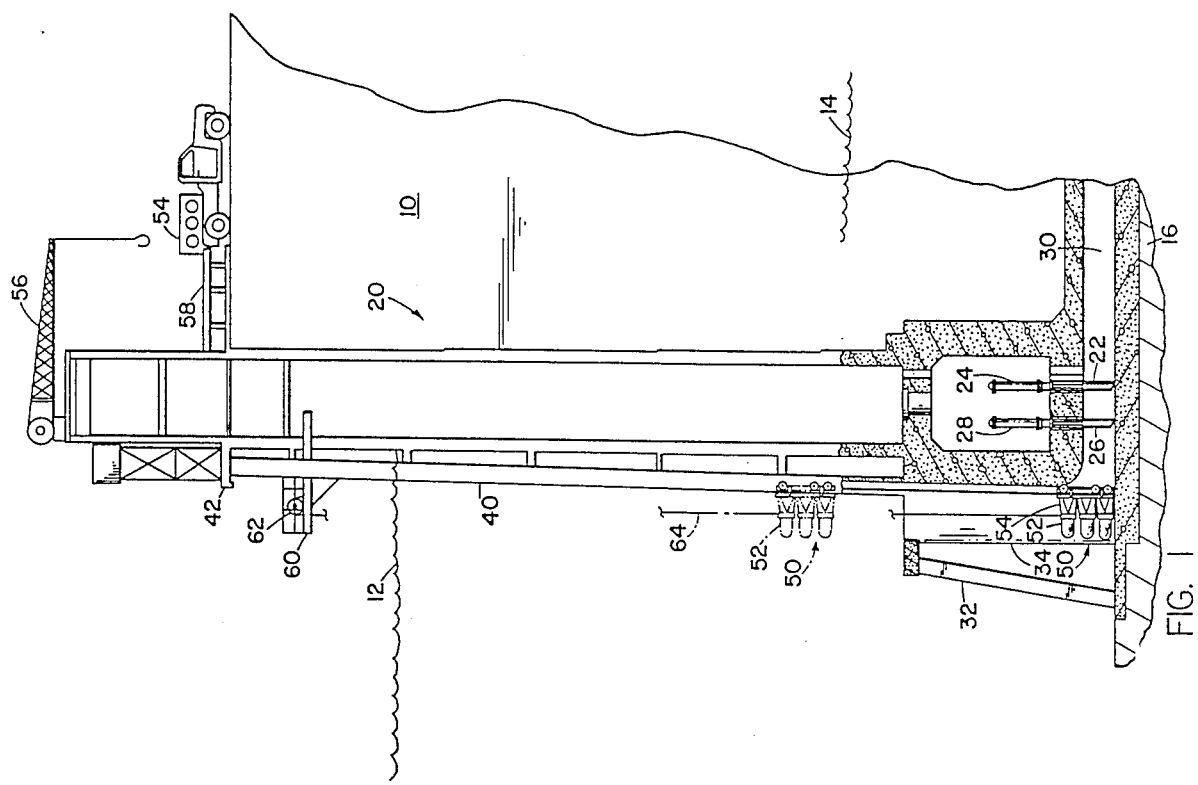
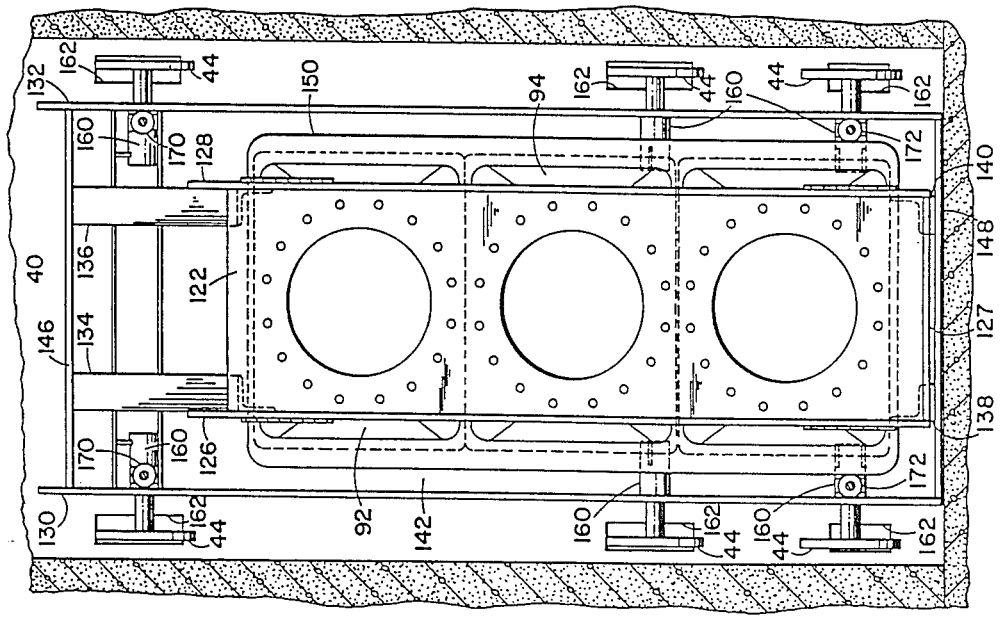

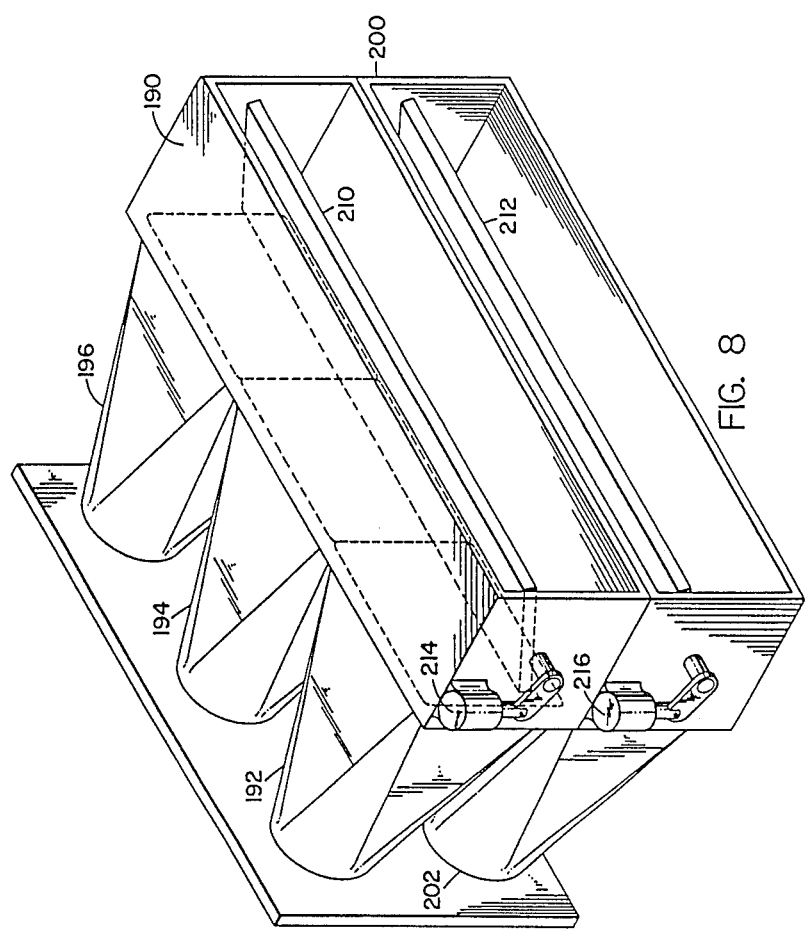
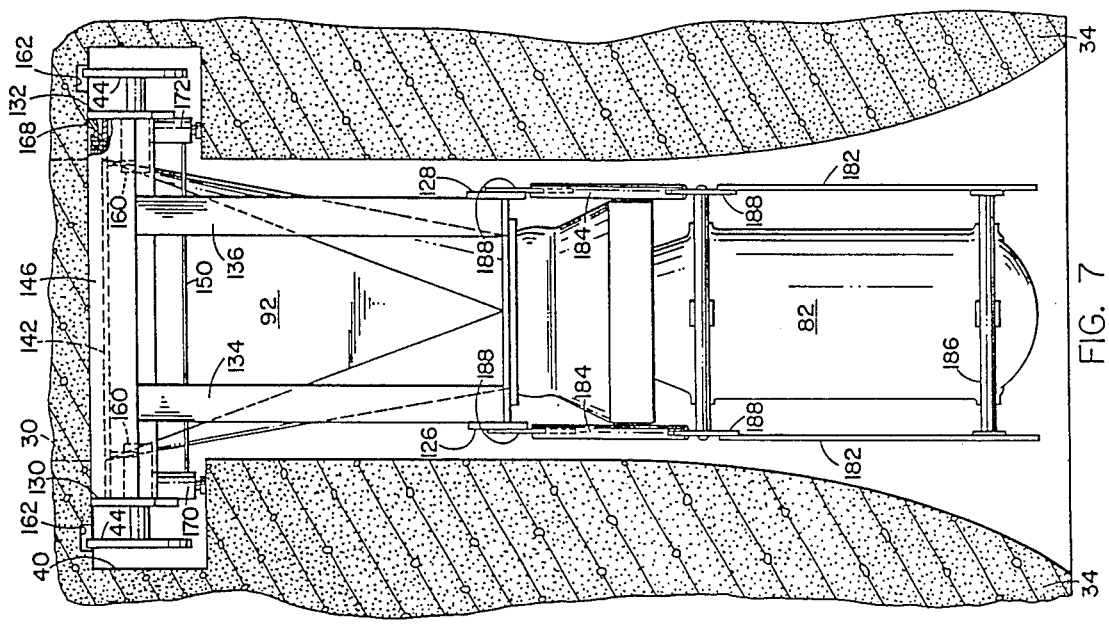

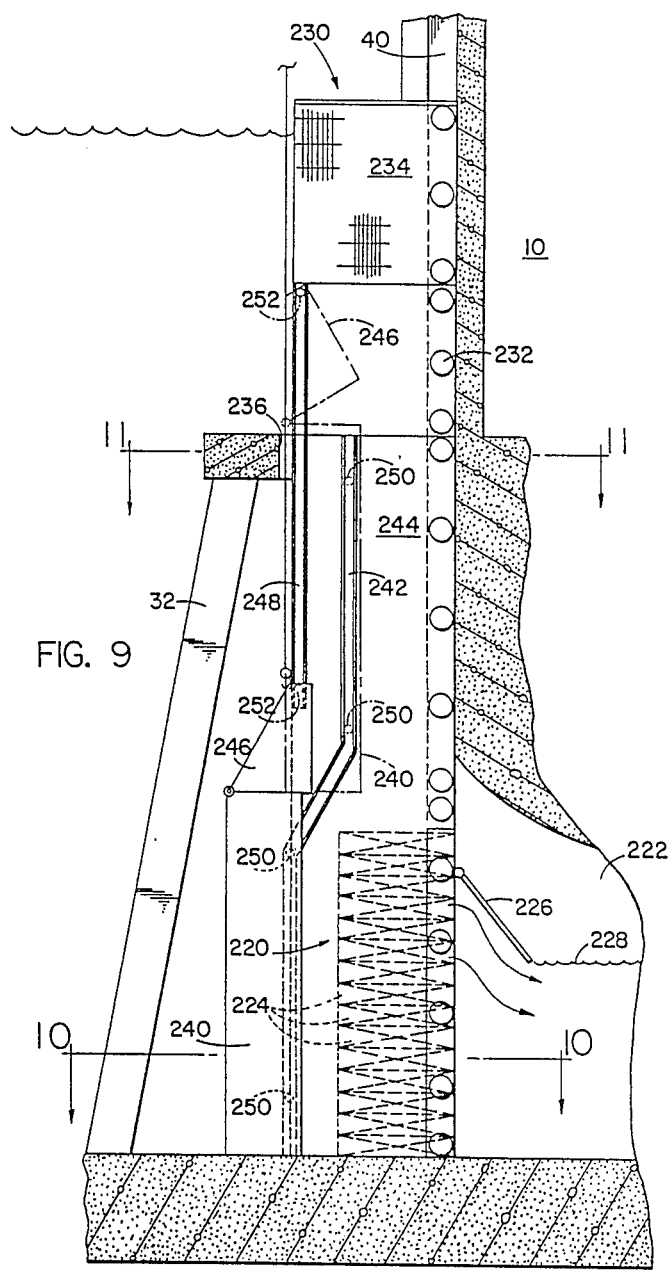
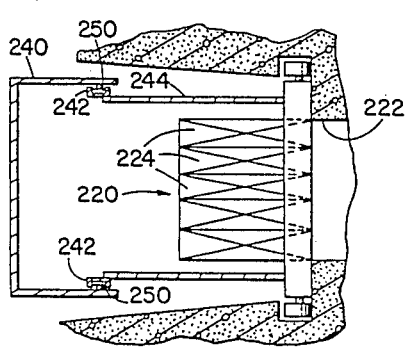
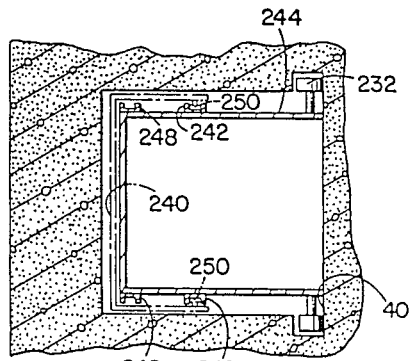
FIG. 9
FIG. 10
FIG. 11

HYDROELECTRIC POWER INSTALLATION AND TURBINE GENERATOR APPARATUS THEREFOR

BACKGROUND OF THE INVENTION

The present invention relates to hydroelectric power installations which utilize turbine generator sets to produce electrical power from the pressure head available at a dam. The invention is particularly advantageous for constructing hydroelectric power installations where the pressure head is generally low and at existing water control facilities which have low level discharge gates and tunnels.

The construction of a hydroelectric installation inherently requires the placement of a turbine generator set and draft tube assembly in a location that is normally well below head water level. Generally a contractor builds a power house downstream of the dam at the site of the proposed installation and then assembles the turbine generator set in place by bringing the individual turbine and generator components into their operating positions. To maintain the water pressure head at the downstream location, the discharge tunnel under the dam must be fitted with a steel liner that will support the water pressure and eliminate water losses through the fissures or permeable soils in the tunnel. The liner in turn must receive a protective interior coating for long-term preservation.

Such construction techniques obviously entail the time and expense of building a power house and pressurized water delivery conduit, but allow a large turbine generator set to be put in place. Servicing of such a generator set later presents access problems, and may require significant disassembly. Delays in repair under these circumstances can be lengthy and may require that substitute power be obtained from an alternative source during the shutdown period.

Also, the size of large turbine generator sets may be so great that transportation of the assemblies is a problem. Additionally, with large turbine generator sets, the total weight may be so great that handling can not be accomplished on site without breaking the sets down into subassemblies. Lifting an assembly into position may be impossible without designing and building new support structures to set up and operate a crane.

An alternative technique for constructing power installations by assembling smaller generator sets above the water level and then submerging the sets upstream of the dam has significant appeal from a cost and efficiency standpoint. First of all, the components and castings for smaller turbine generators can be more readily obtained from a larger number of suppliers, which include machine shops and foundries. Larger components may have limited distribution or may not be available at all except by special order from only a limited number of turbine generator manufacturers with long lead times and extended completion dates. An earlier completion date results in a faster return on the investment through the power generated.

The smaller turbine generator sets also offer the advantage that they can be installed in a smaller structure since, for a given water passageway shape and installed capacity, the length of the turbine is generally proportional to the turbine runner diameter. Smaller turbine generators, therefore, decrease the cost of the peripheral support structures.

Smaller turbine sets also provide a higher specific output per unit weight. Thus, lifting cranes and similar support equipment can be scaled down where an array of smaller turbine generator sets are used in place of a single or lesser number of large turbine generator sets producing the same installed power.

Small turbine generator sets are also easily transported by rail or truck while in some cases large turbine generator assemblies must be constructed at the site because their size or weight exceeds the capacity of lifting cranes, vehicles and roads or access bridges.

A hydroelectric power installation utilizing an array of smaller turbine generator sets also produces long-term economies since individual or sub-groups of the generators can be removed from service for repair or replacement without totally shutting down the power generating facility.

It is accordingly a general object of the present invention to provide small, compact, light weight turbine generator sets which can be readily transported to a hydroelectric power installation and be assembled above the water level and then be lowered by conventional equipment into a submerged, upstream operating position for power generation.

SUMMARY OF THE INVENTION

In accordance with one aspect of the present invention there is provided a hydroelectric power installation comprised as follows. A vertical tower or dam structure is situated in a water course between a head water level and tail water level and has a submerged base with a discharge conduit through which water passes due to the pressure head between the two levels. The structure also has a generally vertical service track extending from the entrance of the discharge conduit at the submerged base upwardly to an elevated servicing point on the structure above the head water level. A hydraulic turbine generator and associated draft tube are movable as a unit in the service track between the elevated head position above the head water level and a submerged, operating position in which the discharge end of the draft tube and the entrance of the discharge conduit are brought into adjacent and fluid-communicating relationship, to permit power generation from water flowing through the turbine generator set and draft tube into the entrance of the discharge conduit.

In another aspect of the present invention, the installation may further include sealing means interposed between the discharge end of the draft tube and the entrance of the discharge conduit.

In accordance with another aspect of the present invention, there is provided a hydraulic turbine generator apparatus comprising the following: a draft tube assembly having an upstream end, a downstream end, and a plurality of draft tubes extending in parallel relationship between the upstream and downstream ends and fixedly connected to one another as an integral, movable unit; sealing means connected with the downstream end of the draft tube assembly for sealing the assembly at the entrance to a fluid passageway; and a plurality of hydraulic turbine generators connected to the upstream end of the draft tube assembly for support, each turbine generator having a turbine casing and runner associated with one of the draft tubes for discharge of the water driving the respective turbine generator.

Yet another aspect of the present invention provides a method of constructing a hydroelectric power installation at a dam or tower structure situated in a water course between a head water level and a tail water level and having a submerged base with a discharge conduit through which water passes due to the pressure head between the two levels. The structure is one having a generally vertical service track extending from the entrance of the discharge conduit at the submerged base upwardly to an elevated position on the structure above the head water level. The method comprises the following steps: at a position above the head water level, assembling a turbine generator set and draft tube assembly as a movable unit; placing the assembled turbine generator set and draft tube assembly in the service track at the elevated position on the structure above the head water level; and lowering the assembled turbine generator set and draft tube assembly as a unit in the service track into a submerged, operating position at the entrance of the discharge conduit.

Other aspects of the invention will be apparent from the following discription.

BRIEF DESCRIPTION OF THE DRAWINGS

FIG. 1 illustrates a hydroelectric power installation incorporating the present invention.

FIG. 6 is an end view of the draft tube assembly in FIG. 5.

FIG. 7 is a top plan view of the turbine generator sets in FIG. 5.

FIG. 8 is a fragmentary perspective view illustrating flow control valves at the discharges from an integrated draft tube assembly.

FIG. 9 illustrates an alternate embodiment of the hydroelectric power installation at the base of the dam.

FIG. 10 is a fragmentary sectional view as seen along the sectioning line 10—10 in FIG. 9.

FIG. 11 is a fragmentary sectional view as seen along the sectioning line 11—11 in FIG. 9.

DETAILED DESCRIPTION OF THE INVENTION AND PREFERRED EMBODIMENTS THEREOF

Figure 2:
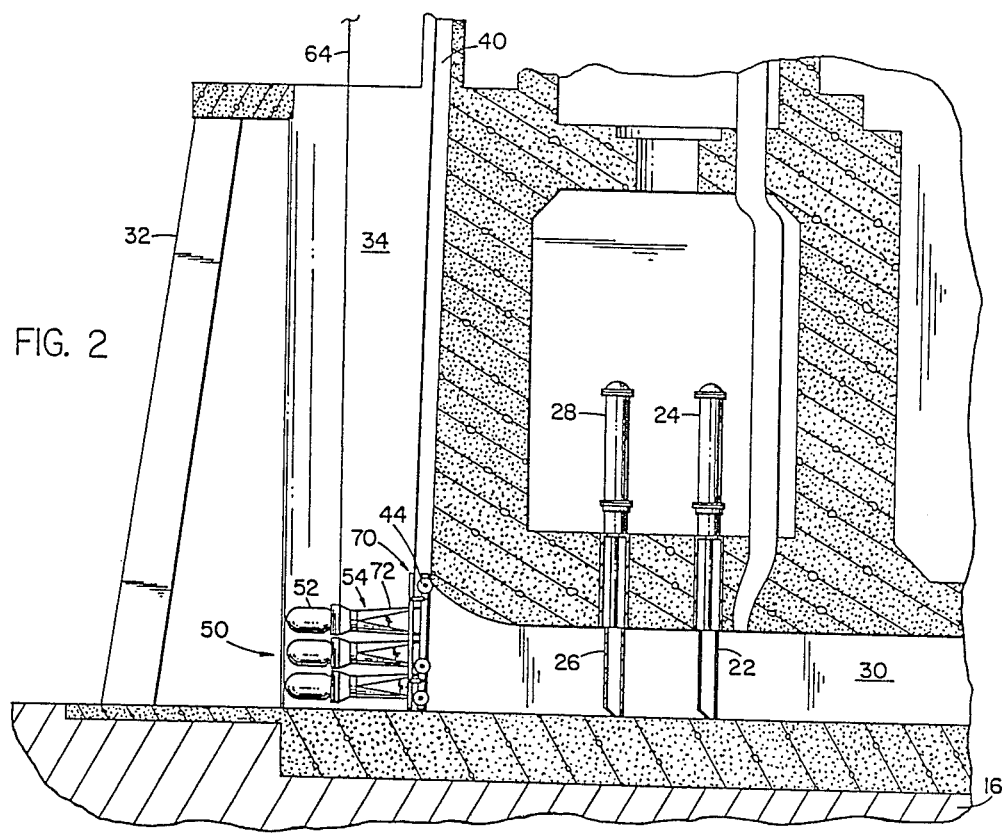
FIG. 2 is an enlarged view of the hydroelectric power installation at the base of the dam.

The present invention is utilized in a hydroelectric power installation that includes a vertical tower or dam structure situated in a water course between a head water level and a tail water level. The structure has a submerged base with a discharge conduit through which water passes due to the pressure head between the two levels, and a generally vertical service track that extends from the entrance of the discharge conduit at the submerged base of the structure upwardly to an elevated servicing point above the head water level.

A hydraulic turbine generator set and associated draft tube are assembled and moved as a unit in the service track between the elevated position above the head water level and the submerged, upstream operating position at the entrance to the discharge conduit. The discharge end of the draft tube and the entrance of the conduit are brought into adjacent and fluid-communicating relationship to permit power generation from water flowing through the turbine generator and draft tube into the discharge conduit.

Hydraulic turbine generator sets and draft tubes can be installed in arrays at the entrance to the discharge conduit by lowering the turbine generator and draft tube units together into position. It is preferable that the draft tube units for several turbine generator sets be constructed as an integral assembly in order to support the turbine generator sets as they are lowered along the service track and while in their submerged, operating positions.

The turbine generator sets in order to be movable along the service track must be low in weight and overall size and length. The reduced size, however, leads to a number of related benefits which are enjoyed at both new construction sites as well as existing water control facilities. New structures designed to accommodate an array of turbine generators require less foundation area and less concrete than structures that employ larger but fewer machines having the same overall generating capacity.

Turbine runners associated with the small turbine generator sets of the present invention run at higher operating speeds than runners in larger machines. The higher speeds eliminate the need for speed increasers and reduce generator costs.

For a given total discharge, the overall length of multiple hydraulic turbine generator sets is proportional to the runner diameter. Thus, an array of smaller turbine generator sets is much shorter than a single large machine, and the smaller sets can more easily be fitted into the available space between trash racks and the discharge conduit at existing sites, frequently without modifying the existing structures.

For a given turbine geometry as well as a given design stress, the weight of the turbine components is proportional to the third power of the runner diameter. At the same time, the power output is proportional to the second power of the runner diameter. From these general design criteria, it follows that the turbine weight per kilowatt is proportional to the runner diameter so that an array of four turbine generators, each having a runner diameter of $\frac{1}{2}D$, has the same power capacity as a single turbine generator with a runner diameter D, but approximately half the weight and overall length. The convenience of handling the smaller units with these size benefits is obvious.

Historically, hydraulic turbines have been assembled from pieces that are machined manually one at a time. Labor cost of machining a large piece for a large turbine generator has been deemed to be less than the cost of machining several small pieces for turbine generators of reduced size and the same capacity. However, the advent of numerically controlled machine tools has significantly reduced the labor cost for producing multiple parts such as those for an array of turbines which might typically require five to five hundred of each part. The relative advantage of numerical control is not as great with larger machines involving fewer parts, and relatively few machine tools with numerical controls are available for preparing large parts. In this regard the present invention utilizing smaller turbine generator sets is more suited to the current state of the art in the machine tool industry.

FIG. 1 illustrates a hydroelectric power illustration that has been integrated into an existing dam 10, an upstream flow control tower or similar structure at a water control facility. The body of water controlled by the dam has a nominal head water level 12 at the upstream side of the dam, and a tail water level 14 illustrated schematically at the downstream side of the dam. The pressure head developed by the two water levels is utilized for producing the hydroelectric power. The base of the dam 10 is constructed on bedrock strata or footings 16 at the bottom of the body of water.

Incorporated into the upstream side of the dam 10 is a service tower 20 which at its base contains a flow control gate with an associated actuator 24 and a shut off gate 26 and an actuator 28. Both gates are positioned in a discharge conduit or tunnel 30 which passes under the dam to the downstream side. In existing dams such discharge tunnels are provided in large numbers to control the amount of water stored in the body at the upstream side of the dam and the rate of discharge to the downstream side. Generally a plurality of discharge tunnels 30 and associated gates 22 and 26 are provided in side by side relationship at one location, and the entrances of the tunnels are protected by a trash rack 32 from large objects such as trees and boulders that might otherwise damage the gates or obstruct the tunnels. The trash rack 32 extends across the front of several piers 34 which separate the waterflow into the entrances of each tunnel as seen more clearly in the plan view of FIG. 3.

Typically a dam installation as shown includes a slot for a shut off gate, bulkhead or stop logs (not shown) at the entrance of the tunnel 30 in order to drain the discharge tunnel and service the emergency gate 26 or the control gate 22. Such a shut off gate is moved downwardly into position and raised upwardly out of position by means of a servicing track 40 which extends from an installation platform 42 at the top of the dam to the tunnel entrance at the bottom of the dam. The gate is raised and lowered by means of a winch on the installation platform 42 and a cable that extends downwardly from the winch and is permanently connected to the gate. The present invention contemplates removal of the shut off gate at existing water control facilities, and utilization of the track 40 for installation of an array 50 of movable turbine generator sets and draft tube assemblies to convert the dam into a hydroelectric power installation. Obviously in new construction, the tracks can be built into the dam specifically for this purpose.

In accordance with the present invention and as shown in FIG. 1, turbine generator sets 52 and a draft tube assembly 54 are delivered by trucks to an off-loading platform 58 at the top of the dam and are unloaded by means of a crane 56. Typically the turbine generator sets 52 are small so that one or more sets can be handled on a truck, and for the same reason, the draft tube assemblies 54 can be handled in the same manner.

Assembly of the turbine generator sets and draft tube assembly in an array 50 is accomplished at a servicing platform 60 which is constructed at the upstream side of the dam and at an elevated position above the head water level 12, unless the installation platform 42 is suitable for this purpose. Assembly of an array begins by positioning the draft tube assembly 54 in the servicing track 40 and lowering the assembly down to the servicing platform 60 with the crane 56. After the draft tube assembly is in place, a turbine is connected to each of the respective draft tubes, then a generator is connected to each of the turbines. If the turbine generator sets 52 are capable of being handled as a single unit, they can be assembled on the platform 58 (if not before), and then be lowered by the crane 56 to the service platform 60 for mounting on the draft tube assembly 54. Small turbine generator sets and draft tube assemblies are preferably assembled prior to delivery.

A winch 62 and cable 64 on the servicing platform 60 or alternatively the crane 56 is then used to lower the array 50 of turbine generators and draft tube assembly down the track 40 from the elevated position at the service platform 60 to the submerged, operable position illustrated in FIGS. 1 and 2 at the entrance of the tunnel 30. In the event that flood conditions demand high volume discharge of the water from the body at the upstream side of the dam, the same winch 62 can be used to raise the turbine generator and draft tube array 50 from the operative position to an elevated, nonobstructing position illustrated in phantom in FIG. 1 above the trash rack 32. The winch 62 utilized to lower the turbine arrays into their submerged, operating positions may be moved to service each of a plurality of tracks 40 shown in FIGS. 3 and 4 or alternatively separate winches for each track can be provided.

Figure 4:
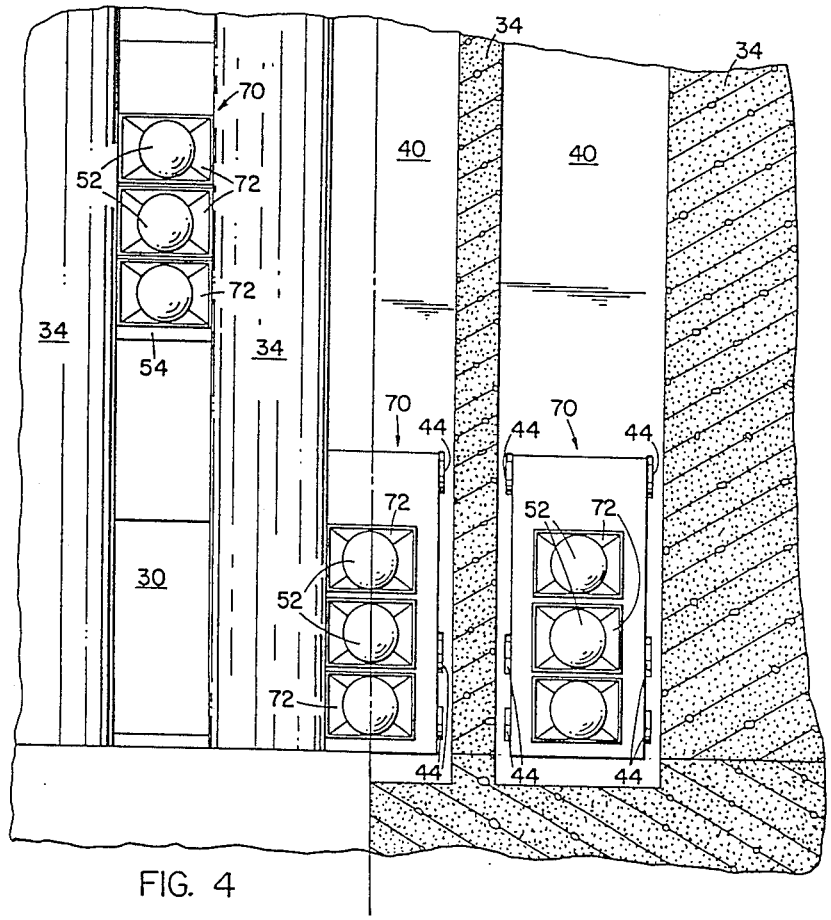
FIG. 4 is a side elevation view of the hydroelectric power installation as seen from the upstream side of the dam.
Figure 3:
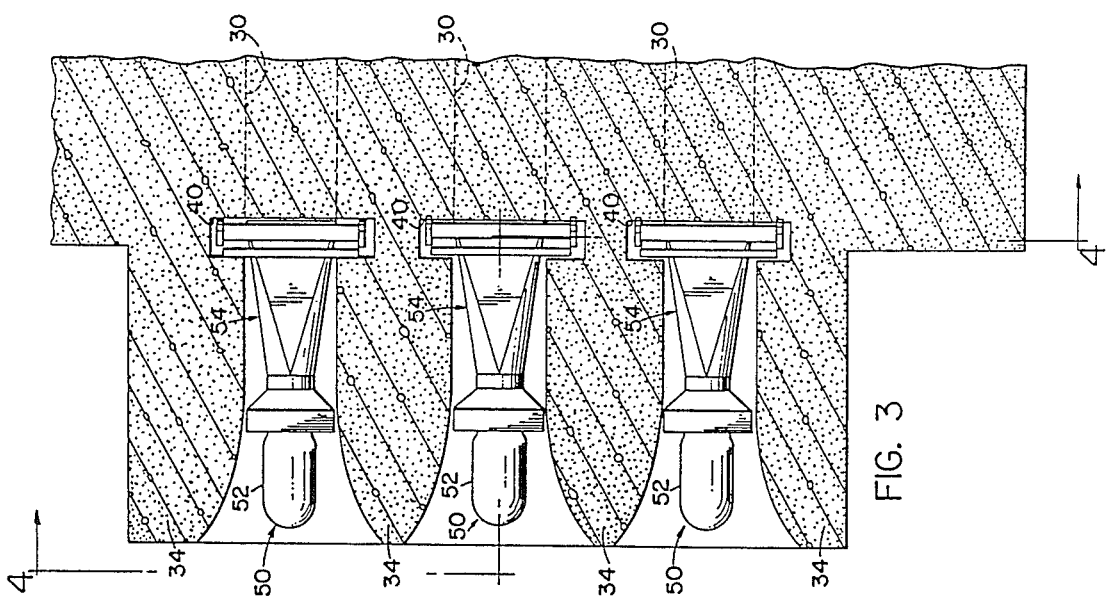
FIG. 3 is a fragmentary plan view of the hydroelectric power installation at the base of the dam.

As shown in FIGS. 2-4 the tracks 40 are fabricated as slots in the concrete piers 34, and may be similarily constructed in the bulkhead that extends up the upstream face of the servicing tower 20. Correspondingly, the draft tube assembly 54 which incorporates individual draft tubes 72 is provided with wheels or rollers 44, or other anti-friction means which travel in and are guided by the tracks 40. The tracks 40 are inclined slightly relative to the vertical direction, and the lifting cable 64 is connected to the array 50 of the turbine generator sets 52 and draft tube assembly 54 now connected as a movable unit near its center of gravity so that the array rests against the dam 10 with limited weight on the rollers 44 and the track 40 as the entire unit is moved up or down. In FIG. 4 one of the movable units on the left has been raised to an elevated position to expose the entrance of the discharge tunnel 30 while the other two units are situated in their submerged, operating positions at the entrances of their respective tunnels.

Figure 5:
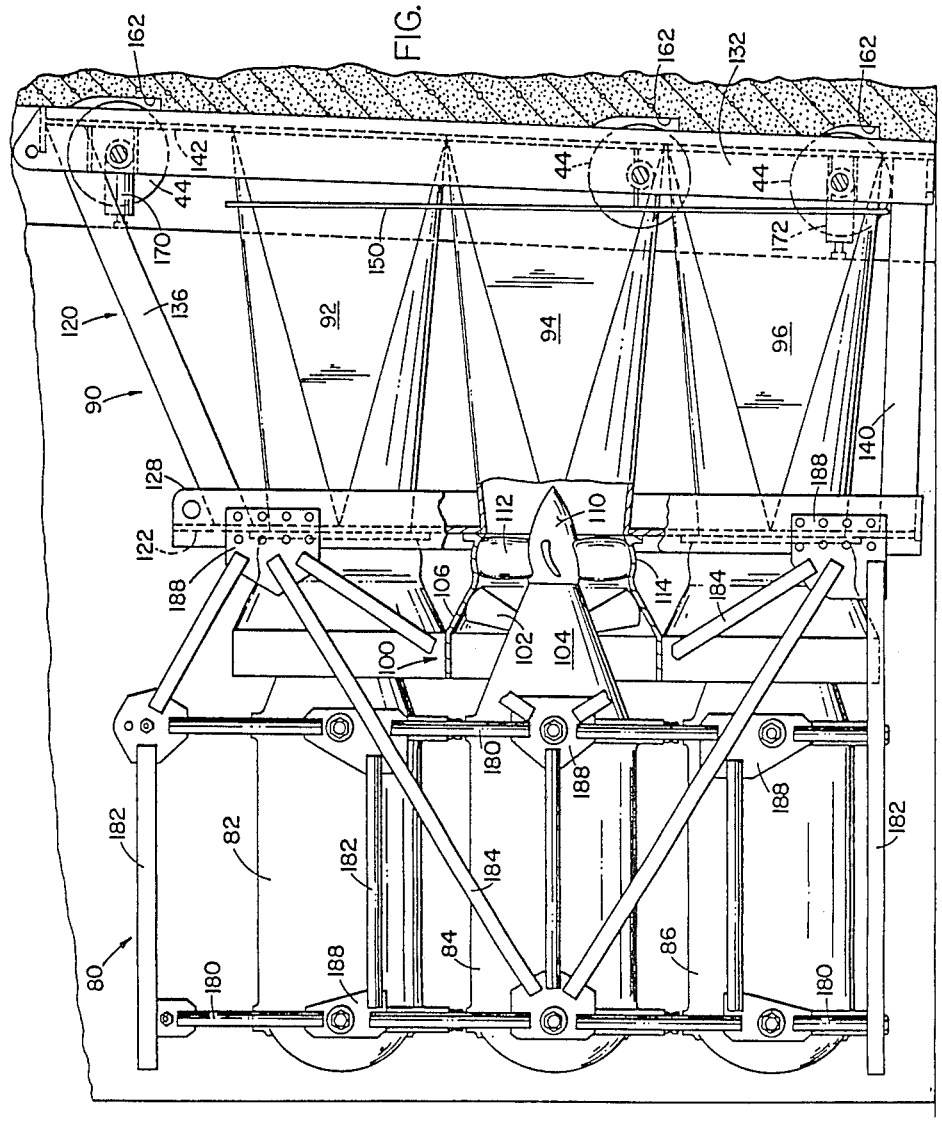
FIG. 5 is a side elevation view showing a preferred embodiment of the invention having three turbine generator sets supported by an integral draft tube assembly.

A preferred embodiment of the turbine generator and draft tube assembly which is lowered as a unit into the submerged upstream, operating position at the entrance of the discharge tunnel 30 is illustrated in detail in FIGS. 5, 6, and 7. In this embodiment three bulb turbine generator sets 82, 84, 86 are stacked in a vertical array 80 and are connected to an integral draft tube assembly 90 composed of individual draft tubes 92, 94, 96. The integral assembly 90 is particularly useful in the present invention since it serves as the structural support for the turbine generator sets during movements up and down the track 40 and during power generation at the entrance to the tunnel 30.

The turbine portion of each generator set includes a distributor 100 as shown in the broken away portion of the turbine generator 84 in FIG. 5. A plurality of guide vanes 102 are evenly distributed about a stationary hub 104 within the distributor shroud 106. A turbine runner 110 is located immediately downstream of the distributor and includes a plurality of turbine blades 112 which rotate within a throat ring or discharge ring 114. The throat ring is connected directly to the inlet of the draft tube 94 for discharge of the water into the entrance of the discharge tunnel 30 under the dam.

If desired, each of the turbine generators sets 82, 84, 86 is surrounded by a trash screen (not shown) to eliminate objects from the water flow prior to entry into the distributors.

The integral draft tube assembly 90 includes a generally rectangular frame 120 which supports each of the draft tubes 92, 94, 96 in parallel relationship. At the upstream ends of the draft tubes shown most clearly in FIG. 6, the frame includes a flange plate 122 having circular cutouts that define circular entrances to the draft tubes. A plurality of flanges on the throat rings couple the turbines and draft tube assembly together in sealing relationship and support the turbine generator sets from the assembly. If necessary gaskets may be installed between the throat rings and the flange plate 122. The flange plate 122 is welded or otherwise secured to two generally vertical stiffeners 126, 128 and a transverse stiffener 127, of the frame 120 as shown in FIG. 6. The upright stiffeners 126, 128 are connected to a similar pair of upright beams or stiffeners 130, 132 at the base of the frame 120 by means of longitudinal, angular section beams 134, 136 at the top of the assembly and by longitudinal angle section beams 138, 140 at the bottom of the assembly. A transverse beam 146 extends between the tops of the vertical stiffener 130, 132 and a similar transverse beam 148 (FIG. 6) extends between the bottom ends of the beams to generally complete the frame structure.

Each of the draft tubes is fabricated from a series of members that form a transition duct with a round cross section in the flange plate 122 at the upstream end and a rectangular section in a similar flange plate 142 (FIG. 6) at the downstream end of the draft tubes. Such a cross sectional transition in each draft tube maximizes the available cross sectional area for discharging water into the entrance of the discharge tunnel from the vertically stacked array of turbine generators.

Reinforcing ribs 150 (only one shown) are preferably constructed around the walls of the draft tubes 92, 94, 96 to prevent deformation and add structural strength to the draft tube assembly. Similar ribs extending longitudinally along the tubes can be provided between the ribs 150 and the other frame members if desired.

The rollers 44 are rotatably mounted to the upright stiffeners 130, 132 at the base of the frame 120 by means of bushings 160 as most clearly seen in FIGS. 6 and 7. In FIGS. 5 and 7, the wheels 44 are shown resting in notches or cutouts 162 that are cut into the tracks 40 at the entrance to the discharge tunnel so that the draft tube assembly actually rests on the tracks by means of the beams 130, 132, 146, 148. When the wheels drop into the notches, a flexible neoprene seal 168 shown in FIG. 7 is brought into sealing engagement with the entrance of the discharge tunnel 30. If desired, a special plate providing a smooth sealing surface can be mounted fixedly to the entrance of the tunnel for sealing purposes. The seal 168 completely circumscribes all the exits from the draft tubes 92, 94, 96 to place the draft tube assembly in sealing relationship with the tunnel. If desired separate seals for the exits of each draft tube may be provided, particularly if the draft tubes are not constructed as an integral assembly with the exits of the tubes actually merging with one another at the flange plate 142 as shown.

It will be understood that once the array of turbine generators has been lowered into the operating position, the lifting cable 64 which is connected to the turbine array along a line that passes close to the center of gravity for the assembled unit is disconnected and tied to the tower 20 for lifting the array to the servicing station or to the flood gate position at some later point in time. In order to maintain the draft tube assembly in sealing relationship with the tunnel 30 when the lifting cable is disconnected, a set of jacks 170, 172 are mounted near the tops of the vertical beams 130, 132, and are extended to engage the tracks 40 and press the draft tube assembly into sealing relationship with the tunnel. The jacks are preferably hydraulic jacks that can be actuated from above the head water level. Before the turbine array is lifted out of its operative position, the jacks 170, 172 are retracted.

As described above, the turbine generators, 82, 84, 86 are bolted directly to the draft tube assembly 90 and are therefore supported entirely by the assembly during operation of the generators. If desired, support for the generators may be augmented by a series of vertical members 180, horizontal members 182, diagonal members 184, transverse members 186 and connecting plates 188 which form a space frame at both sides of the turbine generator sets. Additional support for the turbine generators, particularly snubbers, may be positioned between the turbine generators and the surrounding piers to eliminate vibrations during power generation.

As shown most clearly in FIG. 5, the upright stiffener 132 (as well as stiffener 130, not visible in (FIG. 5) are tilted slightly with respect to the vertical position to match the slope of the track 40 along the servicing tower 20. The tilted position of the beams permits the axes of the turbine generators and draft tube assemblies to assume a truly horizontal position in direct alignment with the discharge tunnel 30.

FIG. 8 illustrates a draft tube assembly in which a plurality of draft tubes 192, 194, 196, arranged in side-by-side relationship in a horizontally extending frame 190 are mounted on top of a similar plurality of tubes 202 in the frame 200. Such an array of draft tubes and associated turbines may be utilized where the piers between discharge tunnels are more videly spaced than illustrated in FIG. 3 or where the turbine generator sets are much smaller and can be mounted in side-by-side relationship and also be stacked in multiple tiers on top of one another to effectively establish a matrix of turbine generators all discharging into a single tunnel.

Where a plurality of turbine generator sets and draft tube assemblies are stacked in an array as shown in FIG. 8, and also when turbines and draft tubes are stacked singly one upon the another as shown in the embodiment of FIGS. 1–7, it is frequently desireable to activate the turbines with flow control valves 210, 212 positioned in the discharge of the draft tubes. The valves 210 and 212 are butterfly valves which are actuated between opened and closed positions to limit the flow through the draft tube by means of actuators 214 and 216 respectively. Each valve 210 or 212 has a butterfly which extends across the discharge aperture of a plurality of draft tubes. When the draft tubes in a given tier are mounted as an integral assembly, the use of a single butterfly plate as shown is facilitated. In an alternate design each tube may be provided with an individual butterfly and the butterflies associated with one tier of the draft tubes may be mounted on a common operating shaft for ganged operation.

When the turbine generator sets are mounted in an array as shown in FIG. 8, and sequential operation of the turbine generator sets is desired, the flow control valve 212 for the lowest set of turbine generators is generally opened first in order to provide a water level at the discharge which completely submerges the discharge aperture and enables the draft tubes to operate effectively with the turbines. The next higher row of turbines would be energized thereafter by opening the upper flow control valve 210.

FIG. 9 illustrates another hydroelectric installation utilizing a multi-tiered array 220 of turbine generator sets and draft tube assemblies 224 which discharge into a tunnel 222. Like the array 50 in the embodiment of FIG. 1, the array 220 is lowered into position along a track 40 FIG. 11 at the upstream side of a dam 10. With a multitiered arrangement sequential startup of the turbine generator sets associated with assemblies 224 is particularly advisable as described in connection with FIG. 8. In addition, however, low tail water levels at the downstream side of the dam may limit the number of turbine generator sets that can be brought into operation at one time.

Accordingly a movable baffle 226 is pivotally connected to the discharge end of the draft tube assembly in an upper portion of the array. With the tail water level 228 located in the mid-portion of the array and the baffle angularly disposed as shown, the baffle 226 serves generally as a draft tube extension for the tiers of tubes above the level and behind the baffle. The turbines served by the draft tubes behind the baffle can then operate in low tail water conditions and take advantage of the low pressure head that is created at the discharge of the tubes due to the water falling from the draft tubes behind the baffle. In effect such water creates a negative pressure head relative to the tail water level and at the same time allows turbine generator sets and draft tubes above the tail water to operate with runners submerged.

The hydroelectric installation illustrated in FIG. 9 also includes a feed conduit or chute extending upwardly from the turbine generator sets to a position below the head water level for feeding water from the upper layers of the body of stored water. Such a feed conduit 230 may be desirable, for example, where the water course is also the water supply for a downstream facility or population, and only oxygenated water from the upper layers of the water body is desired for this purpose.

The feed conduit 230 can, if desired, be provided with rollers or guides 232 so that the conduit, like the array 220 of turbine generator sets can also be lowered into position along the track 40. A screen or filter 234 covers the upper end of the feed conduit to eliminate debris and large objects that might plug the conduit or damage the turbine generator sets.

In order to fit both the array of turbine generator sets 220 and the feed conduit 230 through an opening 236 at the top of the trash rack 32, and at the same time provide a sufficient flow cross section into the array 220 of turbine generator sets, the lower portion of the conduit includes a collapsible roof portion 240, and a guide track 242 extends along the length of the wall portion 244 for moving the collapsible portion from its retracted position shown in FIG. 11 overlying the wall portion 244 of the conduit to its expanded position shown in FIG. 10 in front of the array 220. The collapsible roof portion 240 is a U-shaped section with guide rollers 250 which travel in the track 242. When the collapsible portion is in the expanded position shown in FIG. 10, the guide rollers at the lower edge are located in the lower portion of the track 242 as shown in FIG. 10, and when the collapsible portion is in the collapsed position as shown in FIG. 11, the guide rollers are positioned in the upper portion of the track 242. A short transition section 246 has a guide roller 252 which travels in a different guide track 248 during movement of the collapsible portion 240.

When the feed cunduit 230 is lowered into position through the opening 236 in an existing trash rack 32, the collapsible roof portion 240 overlies the upper part of the wall portion 244 as illustrated in FIG. 11. Once the wall portion is in position as shown in FIG. 9, the collapsible roof portion 240 is lowered in the track 242 to the expanded position shown in FIGS. 9 and 10. It is not necessary that the collapsible roof portion 240, the transition section 246, and wall portion 244 be perfectly sealed since there is no significant pressure differential between the inside and the outside of the chute or feed conduit 230, and the piers 34 closely bound the conduit 230 to reduce flow into the conduit 230 from lower depths of the water body. The majority of the water passing through the array 20 of turbine generator sets will therefore come from the upper layers of the body.

Accordingly, a novel hydroelectic power installation is constructed with a plurality of turbine generator sets and draft tube assemblies which are assembled above the head water level and are lowered into a submerged, operating position at the entrance to a discharge conduit. A plurality of smaller turbine generator sets and draft tube assemblies provide a higher specific power output than a single large generator set and may be more easily fitted into existing water control facilities without significant reconstruction costs. The plurality of turbine generator sets also makes new construction more economical and feasible at certain sites.

While the present invention has been described in a preferred embodiment, it should be understood that numerous modifications and substitutions can be made without departing from the spirit of the invention. It is not essential that an integrated draft tube assembly be used with multiple turbine generator sets. The sets can also be constructed in both linear and rectangular arrays depending upon the size of the turbine generators sets used and the available space at the submerged position. Other types of flow control valves can be used to control the flow of water through the turbine generator sets, or alternatively the guide van of the distributor can be used for this purpose. Additionally, although the turbine generator sets utilize bulb generators, a particularly compact array of turbine generators can be formed with rim-type generator and turbine elements. Also the invention can be employed with various runner designs including mixed flow runners and the illustrated axial flow runners. Accordingly, the present invention has been described in detail with respect to several preferred embodiments by way of illustration rather than limitation.

I claim:

1. A hydroelectric power installation comprising:
a vertical tower or dam structure situated in a water course between a head water level and tail water level and having a submerged base with a discharge conduit through which water passes due to the pressure head between the two levels, the structure also having a generally vertical service track extending from the entrance of the discharge conduit at the submerged base upwardly to an elevated servicing point on the structure above the head water level; and
a hydraulic turbine generator and associated draft tube movable as a unit in the service track between the elevated head position above the head water level and a submerged, operating position in which the discharge end of the draft tube and the entrance of the discharge conduit are brought into adjacent and fluid-communicating relationship to permit power generation from water flowing through the turbine generator set and draft tube into the entrance of the discharge conduit.

2. A hydroelectric power installation as defined in claim 1 further including sealing means interposed between the discharge end of the draft tube and the entrance of the dischar conduit.

3. A hydroelectric power installation as defined in claim 1 wherein:
the entrance of the discharge conduit has a sealing surface facing the discharge end of the draft tube;
the sealing means includes a sealing element; and
adjustable means are provided for pressing the draft tube and the sealing element against the sealing surface in sealing relationship.

4. A hydroelectric power installation as defined in claim 1 wherein a plurality of the hydraulic turbine generators and draft tubes are movable in the service track between the elevated servicing point and the submerged position, the turbine generators and draft tubes of the plurality being positioned in an array in the submerged position at the entrance of the conduit for simultaneous operation.

5. A hydroelectric power installation as defined in claim 4 wherein the turbine generators and draft tubes of the plurality are arranged in a vertical array in the submerged position at the entrance of the conduit.

6. A hydroelectric power installation as defined in claim 5 further including a movable baffle connected to the discharge end of draft tubes in the upper portion of the array as a tube extension between the draft tube and a lower tail water level in the discharge conduit.

7. A hydroelectric power installation as defined in claim 1 further including a flow control valve associated with the turbine generator and draft tube for controlling the flow of water through the turbine and operation of the generator.

8. A hydroelectric power installation as defined in claim 7 wherein:
a plurality of turbine generators and draft tubes are arranged in an array at the entrance of the conduit; and
the flow control valve is associated with one turbine generator and draft tube of the array and not with another turbine generator of the array for controlling the operation the one generator independently of the other generator.

9. A hydroelectric power installation as defined in claim 1 further including feed conduit means extending upwardly from the water driven turbine generator to a position below the head water level for feeding water from the upper layers of the water to the turbine generator and the discharge conduit.

10. A hydroelectric power installation as defined in claim 1 further including a trash rack surrounding the turbine generator and draft tube in the submerged, operating position at the entrance of the conduit, the top of the rack having an opening accommodating the turbine generator and draft tube when moved as a unit in the service track between the elevated and submerged position.

11. A hydroelectric power installation as defined in claim 1 further including a service platform located adjacent the service track at the elevated position.

12. A hydroelectric power installation as defined in claim 1 further including a service crane mounted adjacent the top of the track and having a lifting capacity sufficient to lift the turbine generator and draft tube as a unit from the submerged to the elevated position.

13. A hydroelectric power installation as defined in claim 1 wherein:
a plurality of the hydraulic turbine generators and associated draft tubes are mounted in an array and are movable as a unit in the service track between the elevated and the submerged, operating position; and
the associated draft tubes are interconnected in an integral assembly.

14. A hydroelectric power installation as defined in claim 13 wherein anti-friction means are mounted on the integral draft tube assembly for moving the turbine generators and draft tube assembly as a unit along the service track.

15. A hydroelectric power installation as defined in claim 14 wherein the anti-friction means comprise wheels and the track includes cutouts for the wheels at the submerged, operating position adjacent the entrance of the discharge for resting the draft tube assembly against the entrance in sealing relationship.

16. A hydraulic turbine generator apparatus comprising:
a draft tube assembly having an upstream end, a downstream end, and a plurality of draft tubes extending in parallel relationship between the upstream and downstream ends and fixedly connected to one another as an integral, movable unit;
sealing means connected with the downstream end of the draft tube assembly for sealing the assembly at the entrance to a fluid passageway; and
a plurality of hydraulic turbine generators connected to the upstream end of the draft tube assembly for support, each turbine generator having a turbine casing and runner associated with one of the draft tubes for discharge of the water driving the respective turbine generator.

17. A hydraulic turbine generator apparatus as defined in claim 16 wherein:
each of the plurality of hydraulic turbine generators is aligned with a respective one of the draft tubes in the draft tube assembly; and
support members interconnect the turbine generators with one another and the draft tube assembly to provide additional support.

18. A hydraulic turbine generator apparatus as defined in claim 16 further including anti-friction means connected with the draft tube assembly for moving the draft tube assembly and connected turbine generators as a unit into alignment with a water passageway.

19. A hydraulic turbine generator apparatus as defined in claim 16 further including valve means associated with the draft tube assembly for controlling the flow of water through the turbine generators.

20. A hydraulic turbine generator apparatus as defined in claim 19 wherein:
the valve means includes flow limiting means associated with each of a plurality of draft tubes and common actuating means connected with the flow limiting means for simultaneously controlling the flow in each of the draft tubes.

21. A hydraulic turbine generator apparatus as defined in claim 20 wherein the flow limiting means comprises a butterfly valve disposed in each of the draft tubes of the plurality at the downstream ends.

22. A method of constructing a hydroelectric power installation at a dam or tower structure situated in a water course between a head water level and a tail water level and having a submerged base with a discharge conduit through which water passes due to the pressure head between the two levels, the structure having a generally vertical service track extending from the entrance of the discharge conduit at the submerged base upwardly to an elevated position on the structure above the head water level, the method comprising the steps of:

at a position above the head water level, assembling a turbine generator set and draft tube assembly as a movable unit;

placing the assembled turbine generator set and draft tube assembly in the service track at the elevated position on the structure above the head water level; and lowering the assembled turbine generator set and draft tube assembly as a unit in the service track into a submerged, operating position at the entrance of the discharge conduit.

* * * * *

UNITED STATES PATENT AND TRADEMARK OFFICE
CERTIFICATE OF CORRECTION

PATENT NO. : 4,755,690

DATED : July 5, 1988

INVENTOR(S) : Henry K. Obermeyer

It is certified that error appears in the above—identified patent and that said Letters Patent is hereby corrected as shown below:

Column 3, line 19, replace "discription" with --description--

Column 4, line 65, replace "illustration" with --installation--

Column 6, line 22, replace "similarily" with --similarly--

Column 6, line 46, replace "8O" with --80--

Column 6, line 65, replace "generators" with --generator--

Column 7, line 43, replace "wheels" with --rollers--

Column 7, line 47, replace "wheels" with --rollers--

Column 7, line 56, between "desired" and "separate", add --,--

Column 8, line 9, replace "jacks." with --jacks--

Column 8, line 23, replace "(FIG. 5)" with --FIG. 5)--

Column 8, line 36, replace "videly" with --widely--

Column 9, line 8, replace "40 FIG. 11 at" with --40 (FIG. 11) at--

Column 9, line 9, replace "multitiered" with --multi-tiered--

Column 10, line 1, replace "cunduit" with --conduit--

Column 10, line 15, replace "20" with --220--

Column 10, line 36, replace "generators" with --generator--

Column 10, line 40, replace "van" with --vanes--

Column 11, line 8, replace "dischar" with --discharge--

Column 11, line 10, in claim 3, replace "in claim 1" with --in claim 2--

Column 11, line 47, in claim 8, after "operation", insert --of--

Column 11, line 62, in the last line of claim 10, replace "tion." with --tions.--

UNITED STATES PATENT AND TRADEMARK OFFICE
CERTIFICATE OF CORRECTION

PATENT NO. : 4,755,690

DATED : July 5, 1988

INVENTOR(S) : Henry K. Obermeyer

It is certified that error appears in the above-identified patent and that said Letters Patent is hereby corrected as shown below:

Column 12, line 8, in claim 13, replace "position" with --positions--.

Signed and Sealed this

Thirteenth Day of December, 1988

*Attest:*

DONALD J. QUIGG

*Attesting Officer*　　　*Commissioner of Patents and Trademarks*